(12) United States Patent
Robillard et al.

(10) Patent No.: US 8,571,753 B2
(45) Date of Patent: Oct. 29, 2013

(54) POWER MANAGEMENT SYSTEM FOR A FORESTRY MACHINE TO AUTOMATICALLY ADJUST ENGINE LOAD

(75) Inventors: Jerome M. Robillard, Owatonna, MN (US); Douglas W. Seeger, Prentice, WI (US); Greg D. Finnes, Kasson, MN (US)

(73) Assignee: Caterpillar Forest Products Inc., Peoria, IL (US)

( * ) Notice: Subject to any disclaimer, the term of this patent is extended or adjusted under 35 U.S.C. 154(b) by 557 days.

(21) Appl. No.: 12/759,722

(22) Filed: Apr. 14, 2010

(65) Prior Publication Data

US 2011/0257842 A1    Oct. 20, 2011

(51) Int. Cl.
*G06F 7/00* (2006.01)
*B60R 16/023* (2006.01)

(52) U.S. Cl.
CPC .................................. *B60R 16/0231* (2013.01)
USPC .................. 701/36; 701/41; 701/50; 172/4.5

(58) Field of Classification Search
USPC ....................... 701/36, 41, 50, 412; 172/4.5, 9
See application file for complete search history.

(56) References Cited

U.S. PATENT DOCUMENTS

| | | | |
|---|---|---|---|
| 2,751,943 A | 6/1956 | Ford | |
| 3,767,327 A | 10/1973 | Wagenseil | |
| 3,848,648 A | 11/1974 | Dika et al. | |
| 4,130,980 A * | 12/1978 | Fardal et al. | 701/70 |
| 5,845,689 A | 12/1998 | Egging et al. | |
| 5,878,557 A * | 3/1999 | Wyffels et al. | 460/1 |
| 5,996,342 A | 12/1999 | Khan et al. | |
| 6,267,163 B1 | 7/2001 | Holmes | |
| 6,865,870 B2 * | 3/2005 | Heisey | 701/50 |
| 7,165,397 B2 | 1/2007 | Raszga et al. | |
| 7,481,051 B2 | 1/2009 | Bergquist | |
| 7,974,757 B2 * | 7/2011 | Mackin et al. | 701/50 |
| 8,087,900 B2 * | 1/2012 | Mackin et al. | 123/479 |
| 2005/0279070 A1 * | 12/2005 | Pirro et al. | 56/14.6 |
| 2008/0209878 A1 * | 9/2008 | Farley | 701/50 |

* cited by examiner

*Primary Examiner* — Gerald McClain
(74) *Attorney, Agent, or Firm* — L. Glenn Waterfield

(57) ABSTRACT

A power management system for a forestry machine includes a controller, a cutting tool, a cutting tool positioning system, a propulsion system, and a steering system. The power management system also includes an engine control module for calculating engine load. Based upon the calculated engine load, the controller automatically adjusts at least one of cutting tool speed, cutting tool positioning system power, and steering system power and adjusts the cutting tool speed toward a speed range defined by a first predetermined percentage above a standard set speed and a second predetermined percentage below the standard set speed.

19 Claims, 3 Drawing Sheets

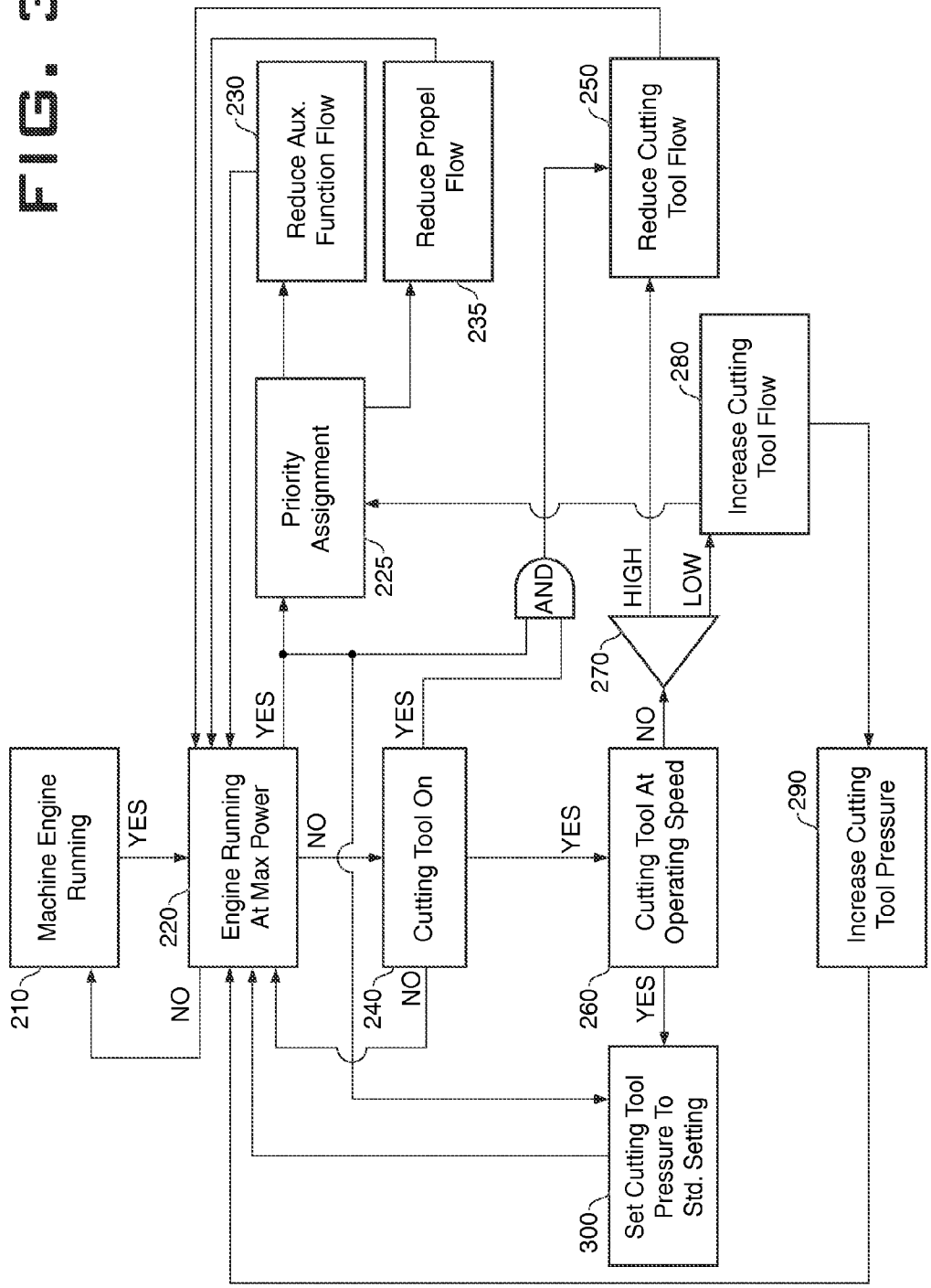

POWER MANAGEMENT SYSTEM FOR A FORESTRY MACHINE TO AUTOMATICALLY ADJUST ENGINE LOAD

TECHNICAL FIELD

This disclosure relates to forestry machines, especially machines known as feller bunchers. This disclosure also relates to forestry machines that mount a shear, processing head, or the like. More particularly, this disclosure relates to a power management system for said machines.

BACKGROUND

Tree harvesters known as feller bunchers are well known in forestry. For an example, see U.S. Pat. No. 6,267,163. In a typical arrangement, a disc saw or other cutting tool is carried on a boom at the front of the vehicle. The vehicle may be tracked or wheeled, and may have a gasoline or diesel engine. The engine typically drives two or more variable displacement hydraulic pumps, at least one of which is for propulsion of the vehicle, one of which is for powering the cutting tool, and one of which is for the hydraulic boom functions. Boom functions include a number of hydraulic powered cylinders and are used to raise, lower, and tilt the rotating saw and work arms.

During customary operation, the engine power useable to drive the pumps is determined by the characteristics of the pump and by the load to which the pump is subjected. The displacement of both pumps is manually controlled by the operator with suitable controls provided in the cab. Once the saw is brought up to speed, the saw drive pump is usually operated at full displacement while the main pump displacement is controlled by the operator, depending on how fast the operator wants to operate the machinery or the loading placed on the machine by its various functions.

However, there are instances when the combined pump loads can total more power than the engine is capable of providing. Consider, for example, the operation of tree felling. As the machine approaches the tree and the saw begins cutting, the saw speed will decrease. The operator may then command more flow from the saw motor and/or pump to increase saw speed. If the other pumps and motors (propel, boom functions, etc.) are also at maximum displacement, the combined load could exceed the maximum engine power and, therefore, stall the engine.

A first known solution to the power management problem involves reducing the speed of the machine. The operator can reduce the speed at which the machine drives through the cut, thereby dropping the demand on the saw power and propulsion systems. This method keeps the saw speed from dropping too quickly, but has the disadvantage of reducing productivity.

A second known solution requires the operator to adjust propel or boom functions to keep the engine speed from dropping too much during the cut. This method depends on timely intervention by the operator. The operator also needs to be able to hear or sense the saw, the various hydraulic systems, and the engine in order to estimate their relative performance. This solution has several drawbacks: (1) the speed of the cut through the tree is often too fast for the operator to react to power requirement changes in time to be effective; (2) sound and vibration isolation of modern cabs can prevent the operator from effectively hearing and feeling how the engine and hydraulic systems are reacting to loads; (3) additional emissions control devices and more effective mufflers on modern engines have reduced the amount of exhaust energy expelled from the engine. The result is a quieter engine that is harder for the operator to hear and to accurately estimate engine load.

A third known solution is described in U.S. Pat. No. 7,481,051 (the '051 patent). This patent discloses a system for limiting the maximum power allotted to the saw pump during operation. This is accomplished via a control in the cab. Limiting the maximum power drawn via the saw pump partially accomplishes the problem of engine stalling, but is detrimental to production. The saw is the primary work implement of the feller buncher, and limiting the saw speed is contrary to the purpose of the machine.

The '051 patent also proposes de-stroking the saw pump in accordance to the main pump displacement setting. While this would also partially address the problem of engine stalling, it does not address the fundamental problem of reduced saw speed, nor does it optimize power management to all of the machine's hydraulic systems.

Finally, there exists in the art the unaddressed issue of operating the machine's hydraulic systems in a coordinated manner for the purpose of increasing efficiency. The operator is not capable of operating each hydraulic system simultaneously at the most efficient point. Accordingly, method for managing the power to the different systems of the machine is needed.

SUMMARY OF THE INVENTION

This disclosure is directed to a power management system for a forestry machine comprising a controller; a cutting tool; a cutting tool positioning system; a propulsion system; a steering system; and an engine control module for calculating engine load. Then, based upon the calculated engine load, the controller automatically adjusts at least one of cutting tool speed, cutting tool positioning system power, and steering system power.

This disclosure also relates to a method of managing power in a forestry machine, comprising the steps of calculating an engine load and automatically adjusting at least one of cutting tool speed, cutting tool positioning system power, propulsion system power, and steering system power based upon the calculated engine load, when the engine load exceeds a predetermined value.

This disclosure further relates to a method of managing power in a forestry machine, comprising the steps of calculating an engine load, sensing a saw speed, and automatically adjusting at least one of cutting tool speed, cutting tool positioning system power, propulsion system power, and steering system power based upon the cutting tool speed and the calculated engine load.

BRIEF DESCRIPTION OF THE DRAWINGS

FIG. 3 is a flow chart showing the operation of power management system 5 including a priority assignment.

DETAILED DESCRIPTION

Figure 1:
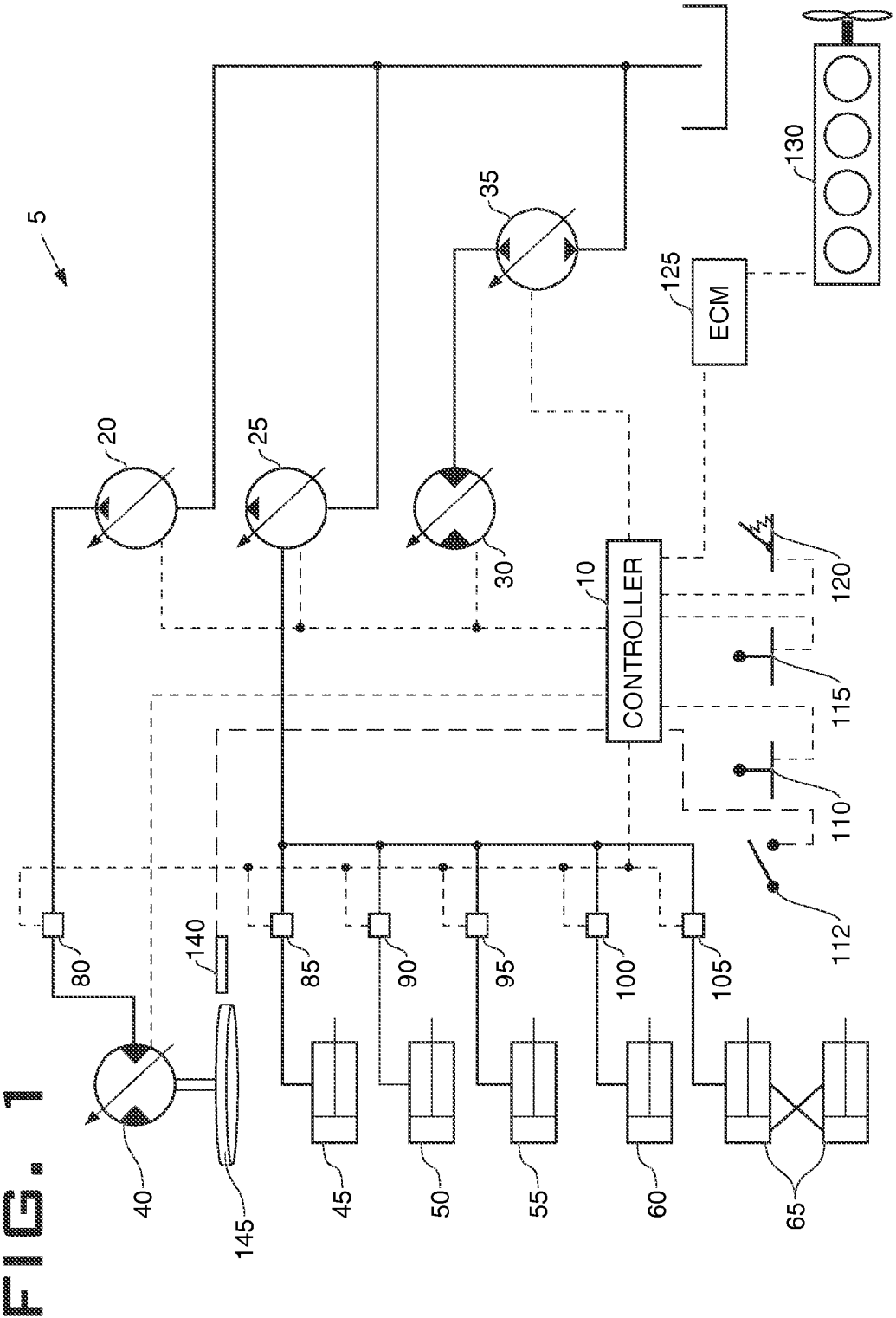
FIG. 1 is schematic diagram of power management system 5.

FIG. 1 depicts a power management system 5 for a forestry machine that is coordinated by controller 10. For exemplary purposes, reference to feller bunchers will be made throughout this disclosure. As noted above, feller bunchers are a type of forestry machine well known in the art. A feller buncher has a boom that holds a cutting tool mounted to the front of the machine's frame. Generally, forestry machine cutting tools include shears, disc saws, or processing heads. In the case of feller bunchers, the cutting tool 145 is usually a disc saw. The cutting tool 145 is turned by cutting tool motor 40. Pressure to the cutting tool motor 40 is controlled by control valve 80. Flow to cutting tool motor 40 is provided by cutting tool pump 20. Cutting tool pump 20 is turned by the engine 130. The engine 130 also turns auxiliary pump 25 and possibly additional pumps. Force for boom functions such as lift and tilt is provided by hydraulic cylinders 45 and 50. Force for harvesting functions such as bunch and gather is provided by hydraulic cylinders 55 and 60. Force for the steering function is provided by hydraulic cylinders 65. Flow for hydraulic cylinders 45, 50, 55, 60, and 65 is provided by one or more pumps (20, 25, 35) depending on the application.

Force for turning the wheels of the machine is provided by propel motor 30. Flow for the propel motor 30 is provided by propel pump 35.

A speed sensor 140 is provided on the cutting tool 145 to provide an indication of how fast the cutting tool is turning. The speed sensor 140 could be optical, magnetic, or any other type as is commonly known in the art. Although the current disclosure applies to a disc saw, the method and speed sensor could readily apply other hydraulically powered rotary implements, such as a processing head, brush mower, stump grinder, mulcher, or broom.

Hydraulic control valves 80, 85, 90, 95, 100, and 105 are provided to control pressure and direction of flow from the pumps 20, 25, 35 to hydraulic components 40, 45, 50, 55, 60, and 65 respectively.

A controller 10 is connected to pumps 20, 25, and 35 in such a manner as to control flow. Such a method is commonly known in electro-hydraulic (EH) type systems. The controller 10 can, for instance, change the swash plate angle in a variable displacement pump in order to increase or decrease flow from the pump. The controller is also connected to the auxiliary pump 40 in a similar manner.

The controller 10 is also connected to control valves 80, 85, 90, 95, 100, and 105 in such a manner as to control pressure from the respective pumps to the respective hydraulic devices. For instance, controller 10 is connected to control valve 80 in such a manner as to control pressure from cutting tool pump 20 to cutting tool motor 40.

The controller 10 is further connected to speed sensor 140 in such a manner as to receive a signal indicative of the speed of the cutting tool 145. The sensor can be optical, magnetic, or any other type that is well known in the art.

The controller is also configured to receive input from a number of operator controls. The operator controls could be an implement control stick 110, a cutting tool switch 112, a steering stick or steering wheel 115, and a propel pedal 120. The implement control stick 110 is typically configured to control boom lift and tilt, as well as the bunch and gather functions of the implement. The implement functions could be combined into one control stick 110 or could be separated into additional sticks, switches, or buttons as is known in the art.

The lift function raises the boom and therefore the implement, in this case cutting tool 145, up and down. The tilt function pivot function moves the entire boom/implement about a pivotal axis. The purpose of the lift and tilt functions acting on the boom is to position the cutting tool. The two functions could therefore be called a cutting tool positioning system, although the cutting tool position system may comprise other functions.

The gather function grabs a tree to be processed by the implement. The bunch function collects multiple trees that can be moved to the next operation.

Operation of the cutting tool 145 is started by activating a switch 112 in the operator's cab. The switch 112 may be on a stick, the dashboard, or on an interactive vehicle display screen. The switch 112 is connected to controller 10 in such as way as to indicate that the cutting tool is to be operated. The controller 10 then operates the cutting tool pump 20, control valve 80, and the cutting tool motor 40 in such a way as to spin the cutting tool 145. The speed sensor 140 provides a feedback signal to the controller 10 to indicate the cutting tool's speed of rotation. Cutting tool motor 40 is preferably a variable speed motor. This allows the motor to have high displacement for high starting torque. When desired cutting tool speed is reached, the cutting tool motor displacement can be reduced, thereby decreasing the energy required to operate it. The control valve 80 is configured to control pressure from the cutting tool pump 20 to the cutting tool motor 40.

The operator indicates desired movement by activating the propel pedal 120. The desired direction can be indicated by a forward/neutral/reverse switch (FNR), which is not shown. The controller 10 operates the propel pump 35 and propel motor 30 in a manner consistent with the operator's movement of the propel pedal 120 and the FNR switch.

The controller 10 is also connected to engine control module (ECM) 125 in such a manner as to receive parameters such as engine load. The ECM is connected to engine 130 via various sensors. The ECM can calculate the load on the engine via, e.g., RPM, manifold pressure, fueling rate, or a combination thereof. The calculated engine load is passed to controller 10.

A fan pump (not shown) and a fan hydraulic motor (not shown) can also represent another type of load on the power management system.

The controller 10 is also configured to resolve priority between simultaneous loads of the propulsion and auxiliary hydraulic systems. When the engine is at or near maximum load and simultaneous loads exist from the propulsion and auxiliary hydraulic systems, the controller 10 can assign a priority to one load or the other. Maximum engine load is defined as, for example, above 90%. The controller 10 is also configured to modify both loads at once, depending on the magnitude of the loads. For instance, one method would be to reduce the higher of the two loads by a larger amount, and the lower load by a smaller amount. For instance, define x and y as auxiliary and propel inputs respectively. The parameters a and b are the auxiliary and propel loads. These loads could be actual or commanded loads. The inputs into the prioritization would be given by:

$$ax + by \qquad (1)$$

If a>b, the output of the method would be given by:

$$\left[\left(\frac{b}{a+b}\right)x + \left(\frac{a}{a+b}\right)y\right]K \qquad (2)$$

The parameter K (i.e. gain) is chosen by the controller 10. If a<b, the output of the method would be given by:

$$\left[\left(\frac{a}{a+b}\right)x + \left(\frac{b}{a+b}\right)y\right]K \qquad (3)$$

If a=b, the output of the method would be given by:

$$\left[\left(\frac{a}{a}\right)x + \left(\frac{a}{a}\right)y\right]K. \quad (4)$$

Figure 2:
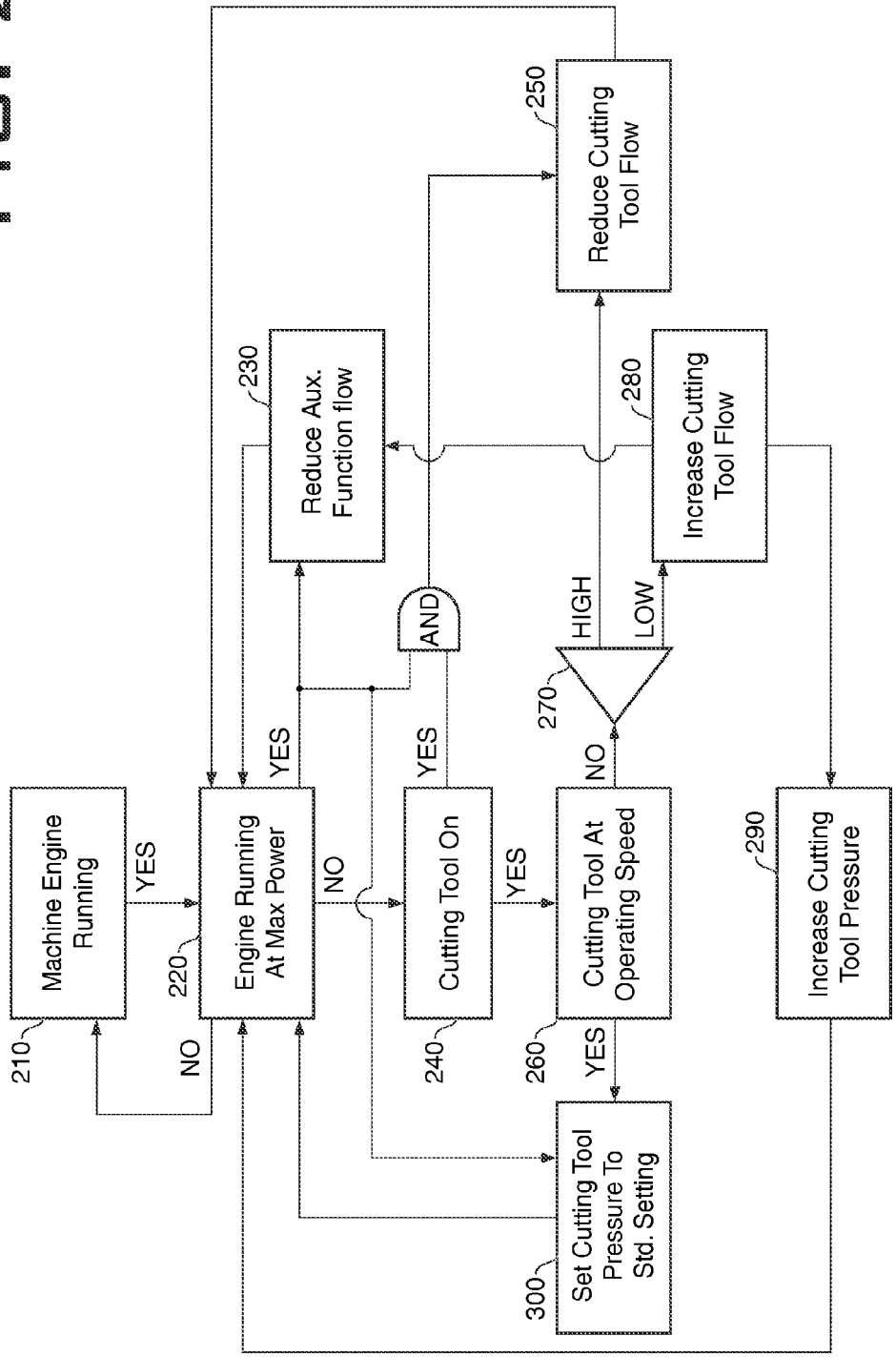
FIG. 2 is a flow chart showing the operation of power management system 5.

FIG. 2 shows a flow chart representing one method for controlling the power management system.

The method begins at Box 210, where the system determines if the engine is running This could be accomplished, for example, by receiving the engine speed signal. If the decision at Box 210 is YES, the method then proceeds to Box 220.

The method determines at Box 220 if the engine is running at maximum power. If the answer is YES, the method proceeds to Box 230 where the system reduces auxiliary function speeds and returns to Box 220. If YES at 220, the method also proceeds to Box 300 where the system sets the cutting tool pressure to a standard setting before proceeding to Box 220. If NO at Box 220, the method proceeds to Box 240.

At Box 240 the method determines if the cutting tool is on. If the decision at Box 240 is NO, the method returns to Box 220. If YES, AND the decision at Box 220 is YES, the method proceeds to Box 250 where the method reduces the cutting tool flow and then returns to Box 220. If YES at Box 240, the method also proceeds to Box 260 where the method determines if the cutting tool is at operating speed. If YES at Box 260, the method proceeds to Box 300.

At Box 300 the method sets the cutting tool pressure to the standard setting, then proceeds to Box 220.

If NO at Box 260, the method proceeds to Box 270, where the method determines if the cutting tool operating speed is HIGH or LOW, which are preset limits that may be set to appropriate levels. If HIGH, the method proceeds to Box 250. An example of HIGH would be 5% above the standard set speed. If LOW, the method proceeds to Box 280. An example of LOW would be 5% below the standard set speed.

At Box 280, the method increases cutting tool flow and then proceeds to Box 290. The method also proceeds from Box 280 to Box 230 before returning to Box 220.

At Box 290, the method increases cutting tool pressure, then proceeds to Box 220.

FIG. 3 shows a flow chart representing a method for controlling the power management system that includes a hydraulic propulsion system.

The method begins at Box 210, where the system determines if the engine is running. This could be accomplished, for example, by receiving the engine speed signal. If the decision at Box 210 is YES, the method then proceeds to Box 220.

The method determines at Box 220 if the engine is running at maximum power. If the answer is YES, the method proceeds to Box 225. Here, the method calculates modified outputs for auxiliary function speeds and propel flow. The method then proceeds to Box 230 and 235 where the system reduces auxiliary function speeds and reduces propulsion system flow before returning to Box 220. If YES at 220, the method also proceeds to Box 300 where the system sets the cutting tool pressure to a standard setting before proceeding to Box 220. If NO at Box 220, the method proceeds to Box 240.

At Box 240 the method determines if the cutting tool is on. If the decision at Box 240 is NO, the method returns to Box 220. If YES, AND the decision at Box 220 is YES, the method proceeds to Box 250 where the method reduces the cutting tool flow and then returns to Box 220. If YES at Box 240, the method also proceeds to Box 260 where the method determines if the cutting tool is at operating speed. If YES at Box 260, the method proceeds to Box 300.

At Box 300 the method sets the cutting tool pressure to the standard setting, then proceeds to Box 220.

If NO at Box 260, the method proceeds to Box 270, where the method determines if the cutting tool operating speed is HIGH or LOW. If HIGH, the method proceeds to Box 250. If LOW, the method proceeds to Box 280.

At Box 280, the method increases cutting tool flow and then proceeds to Box 290. The method also proceeds from Box 280 to Box 225 for priority assignment.

At Box 290, the method increases cutting tool pressure, then proceeds to Box 220.

INDUSTRIAL APPLICABILITY

The power management system 5 for a forestry machine is coordinated by controller 10 in a manner in which to control the power generated and consumed by the machine. Examples of how the system might operate are given below.

In a first example, during movement from one worksite to another, the propulsion system is given priority. The displacement of the other pumps and motors can be reduced to save energy. This can be done automatically by controller 10 even if the operator forgets or neglects to reduce un-needed pump and motor displacement.

In a second example, when the machine is cutting through a tree, the cutting tool power system is the most critical and is given priority. The controller 10 can automatically reduce the power to the other hydraulic systems so that priority is given to the cutting tool power system.

A third example addresses cutting tool power as the machine moves from tree to tree. The inertia of the cutting tool will maintain its speed within an acceptable range for a time. The controller 10 can therefore reduce cutting tool pump and/or motor displacement in order to save energy. The cutting tool speed sensor will indicate when the cutting tool speed has decreased to or below an acceptable level. The controller 10 can then increase cutting tool power.

A fourth example illustrates how the power management system 5 would resolve power demand from the propulsion circuit and the auxiliary hydraulic circuits at the same time. If the engine is at maximum load, the controller 10 will reduce power to both circuits. The amount of reduction for each will be calculated based on the commanded power for each circuit. The circuit demanding the most power will be reduced by a ratio of one circuit to the other. A gain constant may also be applied to the ratio.

What is claimed is:

1. A power management system for a forestry machine comprising:
    a controller;
    a cutting tool;
    a cutting tool positioning system;
    a propulsion system;
    a steering system; and
    an engine control module for calculating engine load;
    wherein, the controller compares the calculated engine load to a maximum engine power value and, if the calculated engine load exceeds the maximum engine power value, the controller automatically reduces at least one of cutting tool speed, cutting tool positioning system power, and steering system power and adjusts the cutting tool speed toward a speed range defined by a first predetermined percentage above a standard set speed and a second predetermined percentage below the standard set speed;

wherein, the maximum engine power value is the maximum power output of the engine.

2. The power management system of claim 1, wherein, based upon the calculated engine load, the controller automatically adjusts propulsion system power.

3. The power management system of claim 2 further including a cutting tool speed sensor associated with the cutting tool.

4. The power management system of claim 3 where the controller adjusts the cutting tool positioning system power before adjusting cutting tool speed.

5. The power management system of claim 3 where the controller adjusts the steering system power before adjusting the cutting tool speed.

6. The power management system of claim 3 where the controller adjusts the cutting tool positioning system power and steering system power before adjusting the cutting tool speed.

7. The power management system of claim 3 where the controller adjusts the propulsion system power before adjusting the cutting tool speed.

8. The power management system of claim 2 where the controller adjusts the cutting tool positioning system power before adjusting cutting tool speed.

9. The power management system of claim 2 where the controller adjusts the steering system power before adjusting the cutting tool speed.

10. The power management system of claim 2 where the controller adjusts the cutting tool positioning system power and steering system power before adjusting the cutting tool speed.

11. The power management system of claim 2 where the controller adjusts the propulsion system power before adjusting the cutting tool speed.

12. The power management system of claim 1 further including a cutting tool speed sensor associated with the cutting tool.

13. The power management system of claim 12 where the controller adjusts the steering system power before adjusting the cutting tool speed.

14. The power management system of claim 12 where the controller adjusts the cutting tool positioning system power and steering system power before adjusting the cutting tool speed.

15. The power management system of claim 12 where the controller adjusts the cutting tool positioning system power before adjusting cutting tool speed.

16. The power management system of claim 1 where the controller adjusts the cutting tool positioning system power before adjusting cutting tool speed.

17. The power management system of claim 1 where the controller adjusts the steering system power before adjusting the cutting tool speed.

18. The power management system of claim 1 where the controller adjusts the cutting tool positioning system power and steering system power before adjusting the cutting tool speed.

19. The power management system of claim 1, wherein each of the first predetermined percentage and the second predetermined percentage is five percent.

* * * * *